(12) United States Patent
Wilder

(10) Patent No.: X9006
(45) Date of Patent: Aug. 15, 1835

(54) PEGS, SHOE, SPLITTING

(76) Inventor: Mark Wilder

Mark Wilder, of Petersborough. New Hampshire

Letters Patent.

The schedule referred to in these Letters Patent and making part of the
same, containing a description in the words of the said Mark Wilder himself
of his improvement in a Machine for splitting shoe pegs.

To all to whom these presents shall come.
Be it known that I Mark Wilder of Petersborough in the County of Hills-
borough and State of New Hampshire, have invented a new and useful improve
-ment in a Machine for cutting or splitting shoe pegs, and that the following
is a full and exact description of the construction and operation of the said
Machine as invented or improved by me.
The machine consists of a substantial oblong bed piece secured to two strong
cross sills which project sufficiently far to receive the tenons of four upright
corner posts of a strong frame connected at top by suitable caps, & cross pieces
that supports the machinery hereinafter described; in the middle of the upper side
of the bed piece running its whole length is a groove, in which slides a correspond
ing tongue made on the under side of a sliding carriage or platform of the same
length as the bed, upon the front end of which the block to be cut, into pegs, is placed
a flat circular metallic disk or wheel, having a hole at its centre in the under
side that receives a steady pin fastened in the upper face of the carriage, being
first placed under said block so as to form a level solid bearing for the block, near
the front margin of the disk several fixed points or screws rise, which range
in a short arch of a circle concentric to said margin and against which the block
to be cut is made to bear by means of a very narrow strap connected to one of said
screws, and which after being passed around the block is led over a small hori
zontal friction roller, at the front margin of the disk, having a weight attached
to the end, the operation of which is to draw the block against the fixed
points and prevent it from separating until the pegs are completed a small
projection is made on the front end of the carriage on which the weight may be locked whilst the operator is replacing the blocks. along the middle of the rear
half of the carriage is a ratched bar or rack operated by a double pall so as
to advance the carriage as follows; from a horizontal cross shaft which has
its bearings in two boxes projecting from the front side of a cross rail of the back
portion of the frame descends an arm to a point nearly level with the rack,
the arm being mortised through the shaft, and confined by a side screw, so as
to admit of being lengthened or shortened, for the purpose of adjusting the feed
to suit pegs of different sizes. to the foot of the arm the pall which is of ordi-
nary make is attached by a pin on which it works as a centre, the pall itself
extending forward, horizontally, immediately under this pall is another one end of which
is attached to the lower side of the back cross rail first mentioned by a thumb
screw, and the other extending to near the end of the upper pall is turned down
thus serving as a lower pall or hold, these palls are kept down by a weighted
cross lever having a left strap or staple on the lower side through which
the palls pass, and are thrown out of gear by raising the end of a second
or transvers lever at the front or tending side of the machine within
reach of the operator, from the front side of the shaft is a long arm that
extends forward and attaches by a shifting screw so as to regulate the feed to a
strut or arm from the knife shaft by the upward and downward motions
of which the palls are operated and carriage is advanced the receding mo-
tion of the carriage being produced by a chord and weight attached to
the back end thereof operating over a pulley. The knife which is straight
and made of tempered steel, ground with a double bevel to a smooth <u>not</u> a sharp
edge, has a broad flat tang or strap rising from the middle of the back
the whole resembling a letter T this tang enters a slot or groove in the
lower end of the knife shaft which latter is a flat upright shaft that slides
up and down midway between the front posts, through two suitable cross
pieces or guides placed one immediately above the other at the front of
the frame and is secured by screw bolts, that pass through two oblong
holes in the tang so as to admit of the knife being lowered or raised
by means of a wedge or key that passes through the shaft acting
against the upper end of the tang, and thus adjusts it to the length
of the pegs to be split, immediately in rear of the knife from the under side of the lower guide piece by two short arms mortised through said piece is suspended a semicircular gaurd in a horizontal position just over the block to be split, the object of which is to prevent the block from canting up at the back edge when the front is operated on by the knife. To the upper end of the knife shaft is attached a toggle joint lever that extends to the top of the frame through two guide rails or bars, which toggle joint is worked by a horizontal bar, attached to the crank of the operating shaft, the length the crank being such as to cause by each revolution thereof two upward and two downward motions of the knife shaft, the operating shaft being also supplied with a balance wheel, and a fast and loose pulley by which the power is applied to the machine, by a shifting strap.

Also from a small rocking shaft fixed on the front face of the cap rail a lever descends to within reach of the operator, it has a transverse bar a short distance above the toggle joint notched out of the width of the toggle lever, for the purpose of pressing the toggle lever to one side, and thereby raising the knife when the machine is stopped, to replace the block. Operation.

The blocks after being pointed by a grooving tool in the ordinary way or by any other means are successively placed on the circular disk and the confining strap put around them — the weighted lever is then raised, and the carriage recedes by the operation of the chord & weight at the rear end The disk is then turned till either set of grooves in the block stand parallel to the edge of the knife. The operating shaft is then put in revolution and the knife rises and depresses twice for every turn of the crank, each time it rises operating on the palls so as to advance the carriage and block, the thickness of one peg, until the whole breadth of the block is traversed by which operation the pegs are rived or severed in one direction and continue to be held together by the strap, the weighted lever is then raised and the carriage recedes, the disk is now turned one fourth round which brings the remaining groovs parallel with the edge of the knife and the Machine being again set in revolution, the block is traversed in a similar manner by the knife and the block being finished is removed and replaced by another and so on. after being thus prepared the pegs are sorted in the usual way. The dimensions of the machine being variable to suit circumstances I have not mentioned any in the foregoing description altho I have found the following to answer well in practise, frame about 9 feet high 3½ long 3 wide bed piece 2 ft. 8 wide, carriage 17 inches wide joints of the toggle about 2½ feet each.

Now what I claim as new and as my invention for which I ask Letters Patent, is the toggle joint lever & knife shaft, the revolving disk and apendages together with the pullys by which the feeding is effected the whole operating in combination for the purposes and in the manner here in set forth, and described. In testimony that the foregoing is a true specification of my said improvement I have hereunto set my hand this 4th day of July 1835.

Witnesses

William Thayer
Tom Thayer

Mark Wilder

Exd.
Ch. M.